Aug. 2, 1966  D. E. REED  3,263,920
STORAGE AND TRANSFER DEVICE
Filed July 11, 1963  9 Sheets-Sheet 1

INVENTOR.
DONALD E. REED
BY
John F. A. Earley
ATTORNEY

INVENTOR.
DONALD E. REED
BY
John F. A. Earley
ATTORNEY.

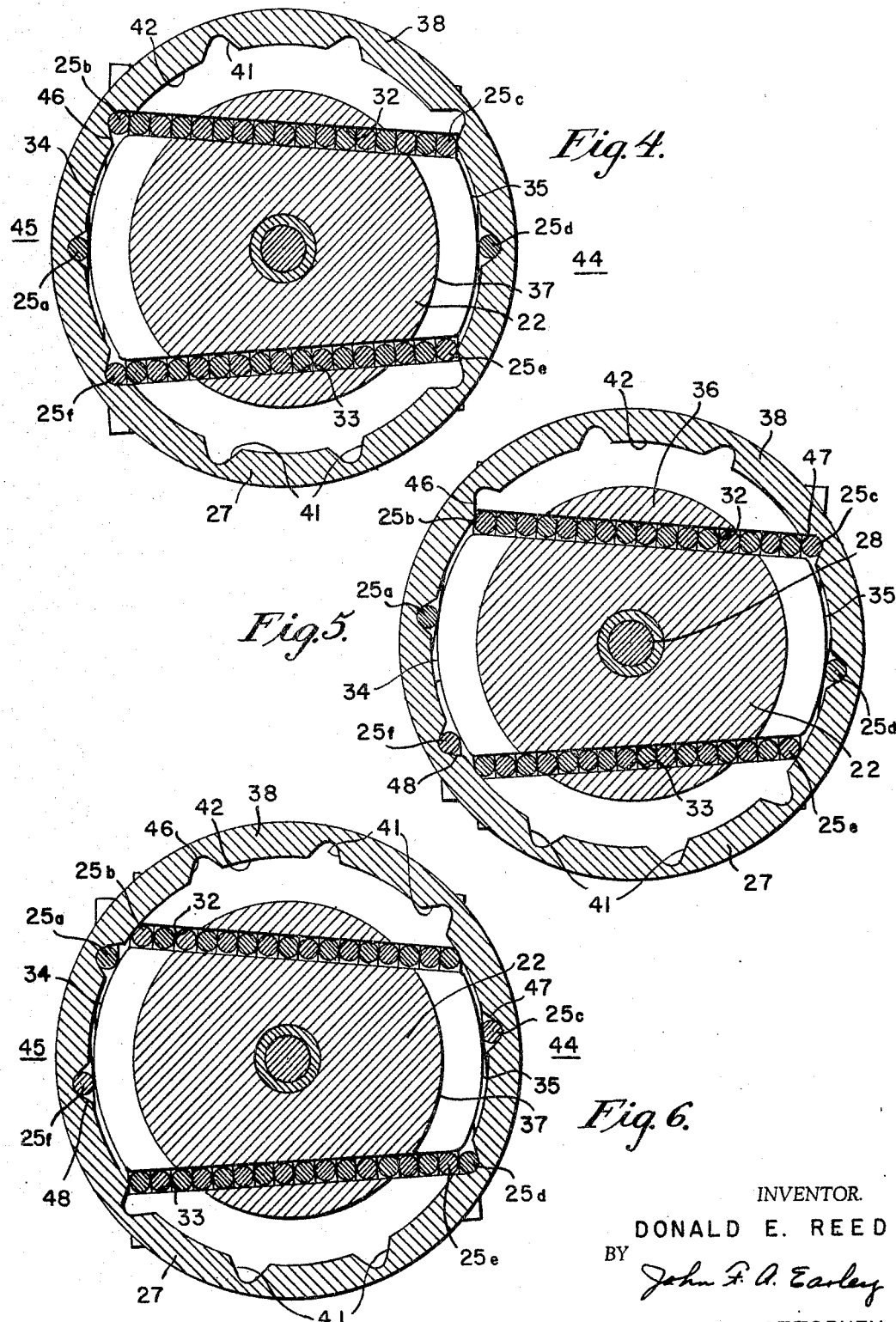

Aug. 2, 1966 D. E. REED 3,263,920
STORAGE AND TRANSFER DEVICE
Filed July 11, 1963 9 Sheets-Sheet 4

INVENTOR.
DONALD E. REED
BY
John F. A. Earley
ATTORNEY.

Aug. 2, 1966  D. E. REED  3,263,920
STORAGE AND TRANSFER DEVICE
Filed July 11, 1963  9 Sheets-Sheet 5

INVENTOR.
DONALD E. REED
BY John F. A. Earley
ATTORNEY.

Aug. 2, 1966 D. E. REED 3,263,920
STORAGE AND TRANSFER DEVICE
Filed July 11, 1963 9 Sheets-Sheet 7

INVENTOR.
DONALD E. REED
BY
John F. A. Easley
ATTORNEY.

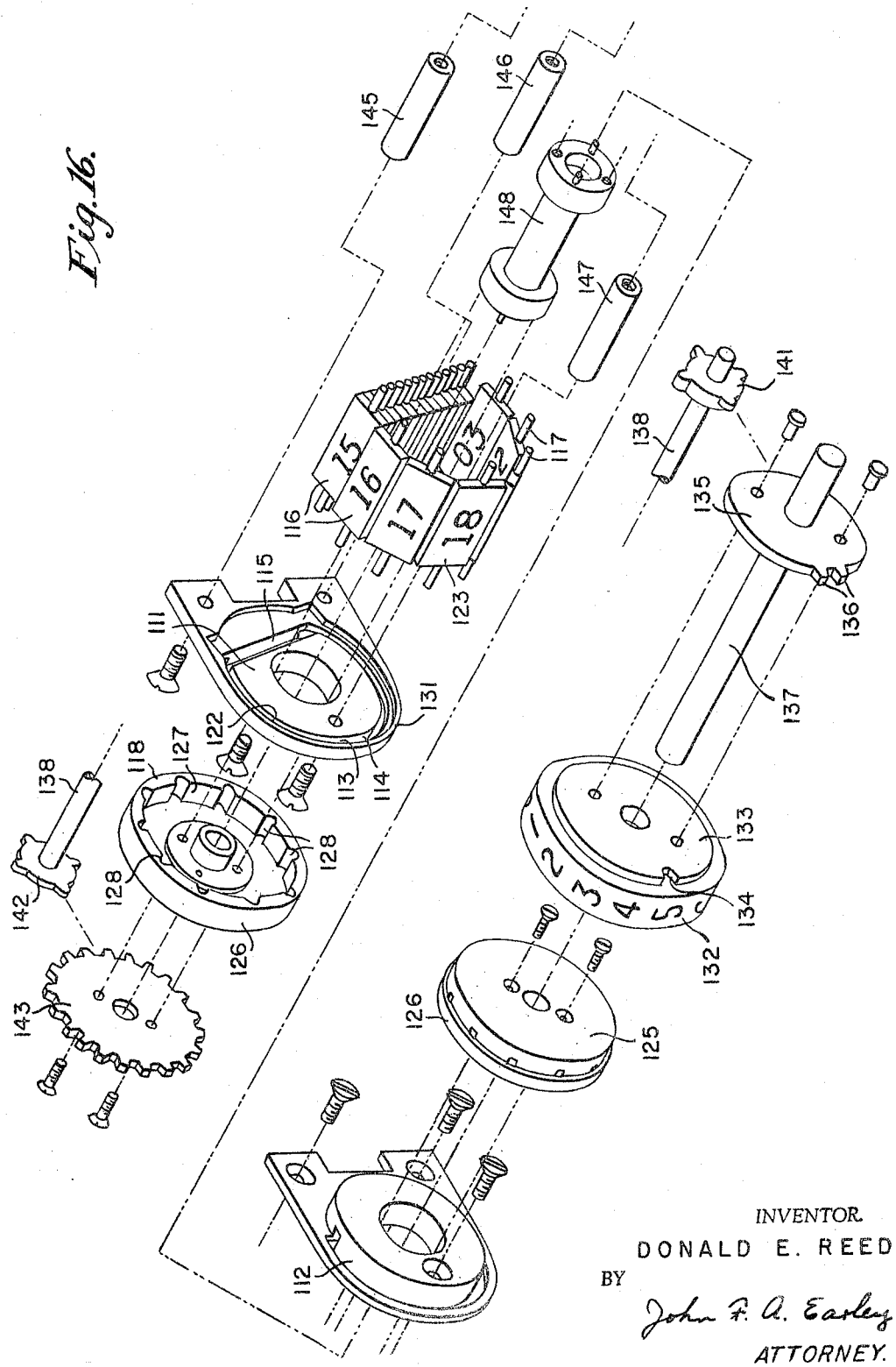

United States Patent Office 3,263,920
Patented August 2, 1966

3,263,920
STORAGE AND TRANSFER DEVICE
Donald E. Reed, Upper Providence Township, Delaware County, Pa., assignor, by mesne assignments, to Litton Industries Inc., Beverly Hills, Calif., a corporation of Delaware
Filed July 11, 1963, Ser. No. 294,366
17 Claims. (Cl. 235—117)

This invention relates to a storage and transfer device, and more particularly concerns such a device which operates at all attitudes, is reversible, and which sequentially and repeatedly displays a large number of elements. This invention may be used as a 360° angle counter, and two embodiments of the invention as an angle counter are illustrated and described herein.

This application is a continuation-in-part of patent application Serial No. 214,221 filed on August 2, 1962, which is now abandoned.

It is an object of this invention to provide a storage and transfer device of improved construction, one which occupies a very small space.

It is another object of this invention to provide a new and improved 360° angle counter.

Other objects and advantages of the invention, including its simplicity and economy, as well as the ease with which it may be adapted to existing equipment, will further become apparent hereinafter and in the drawings, in which:

FIG. 4 is a view in section taken as indicated by the lines and arrows 4—4 which appear in FIG. 3;

FIGS. 5 and 6 are views similar to FIG. 4 but show later stages in operation of the device;

FIG. 16 is an exploded isometric view of the device, an angle counter, of FIGS. 13–15.

Figure 1:
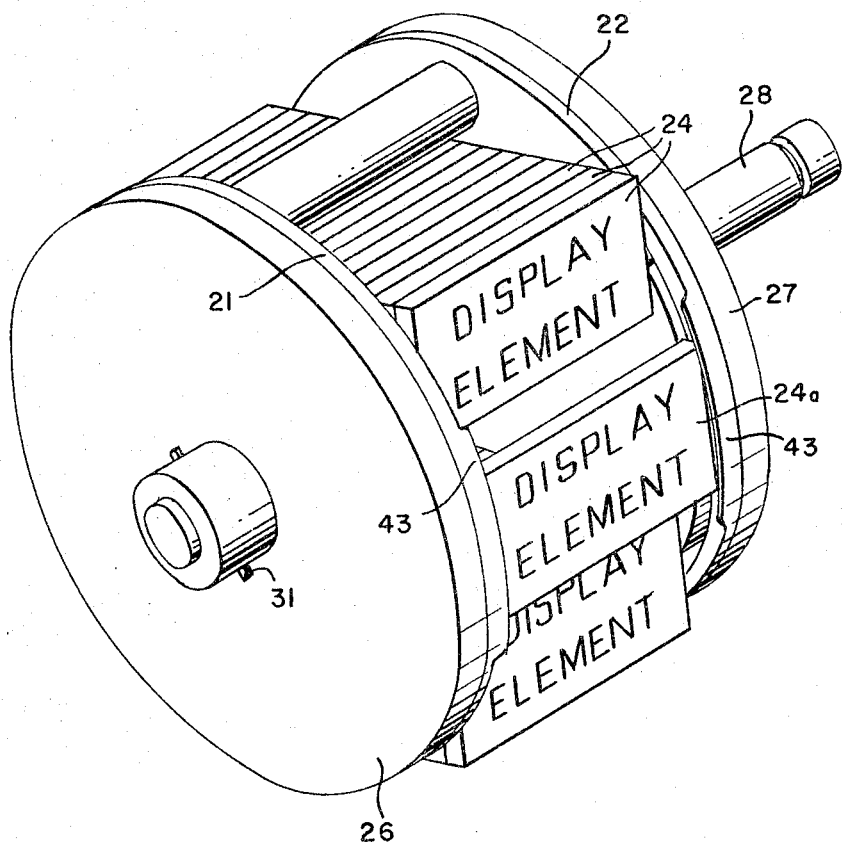
FIG. 1 is an isometric view of a storage and transfer device construction in accordance with this invention.

Although specific terms are used in the following description for clarity, these terms are intended to refer only to the structure shown in the drawings and are not intended to define or limit the scope of the invention.

Turning now to the specific embodiments of the invention selected for illustration in the drawings (FIGS. 1–12), there is shown a storage and transfer device which comprises a pair of spaced-apart guide groove plates 21 and 22 having a continuous guide groove 23 formed therein, a series of elements 24 having a support lug 25 extending from each side into one of the guide grooves 23, and drive means including pick-up cam wheels 26, 27 for picking up the lugs 25 of each element 24 in succession and moving the element to a desired position. Pick-up cam wheels 26, 27 are fixedly mounted on shaft 28 by pins 31, and guide groove plates 21, 22 are rotatably mounted thereon.

Guide grooves 23 (see in particular FIGS. 4–6 and FIG. 12) are provided with an upper storage run 32, and a lower storage run 33 that are connected together by front transfer run 34 and rear transfer run 35. Upper and lower runs 32, 33 are straight, and front and rear runs 34, 35 are circular with front run 34 being longer than rear run 35 so that upper and lower runs 32, 33 are not parallel, but instead slant rearwardly toward ecah other.

The outer surface of guide groove plates 21, 22 are provided with a circular boss 36 having a cylindrical surface 37.

Pick-up cam wheels 26, 27 are mounted adjacent guide groove plates 21, 22 and are provided with an axial flange 38 which has radial cam notches 41 formed therein. Inner cylindrical surfaces 42 of pick-up cam wheels 26, 27 are concentric with outer cylindrical surface 37 of guide groove plates 21, 22. The lugs 25 of elements 24 extend through guide grooves 23 and are picked up by notches 41 as pick-up cam wheels 26, 27 are rotated.

Figure 2:
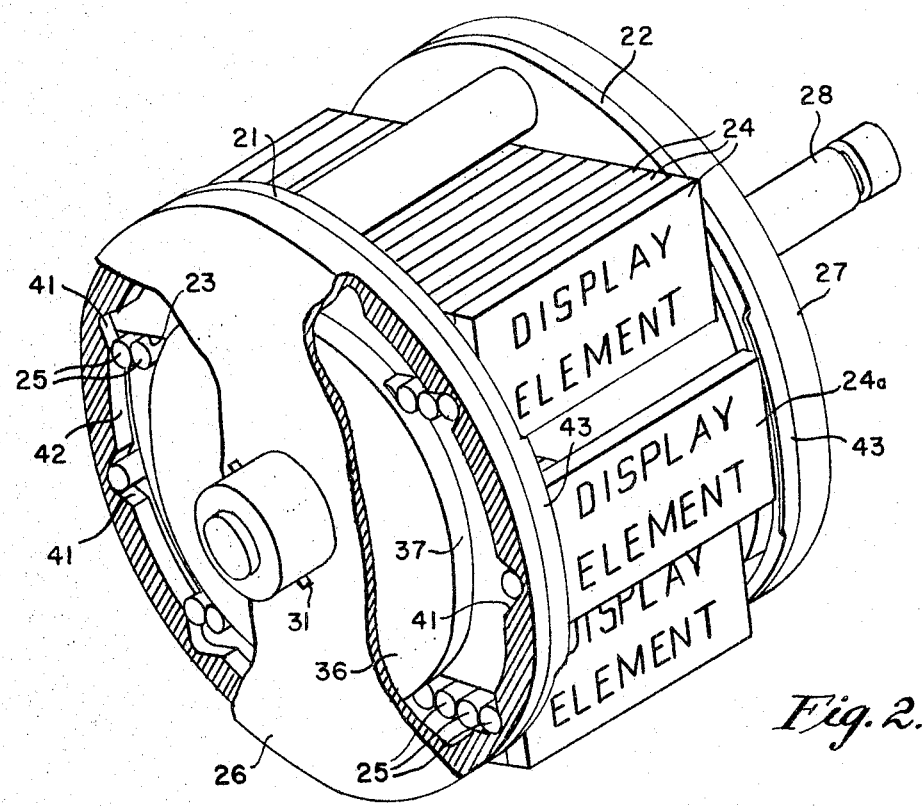
FIG. 2 is a view similar to FIG. 1 with parts cut away in order to better illustrate the invention.
Figure 3:
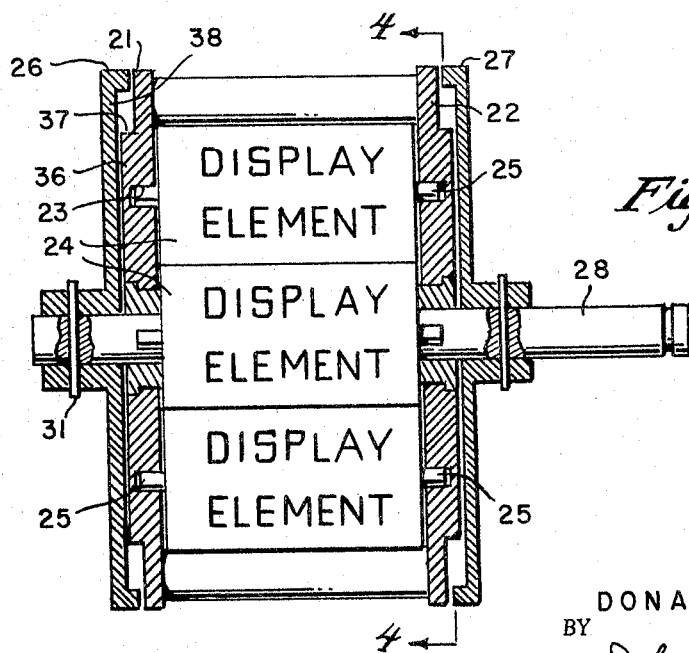
FIG. 3 is a view in vertical section of the device.

Guide groove plates 21, 22 are also provided with guide shoulders 43 (FIG. 2) which extend inwardly toward each other and overhang the side edges of elements 24 to prevent the elements from rotating when in the center display position illustrated by element 24a in FIG. 2.

As shown in FIG. 4, there may be a readout station 44 at the rear of the device which illustrates only one element 24 at a time, and there may be a readout station 45 at the front of the device which displays up to three elements 24 at one time. In FIG. 4, the element of lug 25d is being shown at readout station 44, and the elements of lugs 25a, 25b, and 25f are being shown at readout station 45. It will be realized that either or both readout stations may be utilized, and readout station 44, for example, may be the rear, or the front, or the top, or the bottom, depending on the attitude of the device.

In operation, referring to FIGS. 4–6, when flange 38 is rotated in clockwise direction, lug 25b is cammed by notch shoulder 46 into upper storage run 32 and pushes lug 25c into rear transfer run 35 where it is contacted by notch shoulder 47.

Similarly, lug 25e is cammed into lower storage run 33 and pushes lug 25f into front run 34 where it is contacted and moved by notch shoulder 48. Lug 25a is moved upwardly along front run 34 by the notch 41 which it occupies, and lug 25d is moved downwardly in rear run 35 by its associated notch 41.

As the rotation of flange 38 continues, lug 25f approaches the center display position of readout station 45, and lug 25c approaches the display position of readout station 44 (which was formerly occupied by lug 25d in FIG. 4).

This operation may be continued to sequentially display all of the elements 24. Moreover, flange 38 may be rotated counter-clockwise to reverse the operation if desired.

Figure 7:
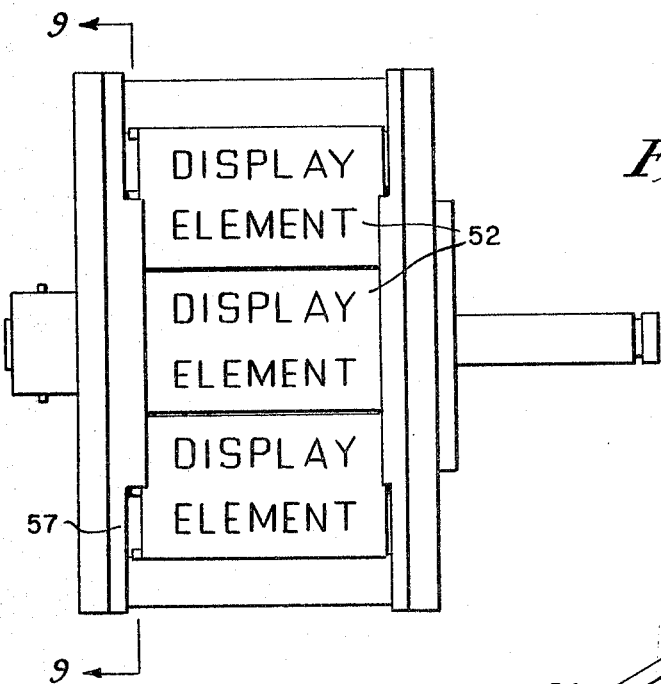
FIG. 7 is a view in front elevation of an alternative embodiment of the invention.
Figure 8:
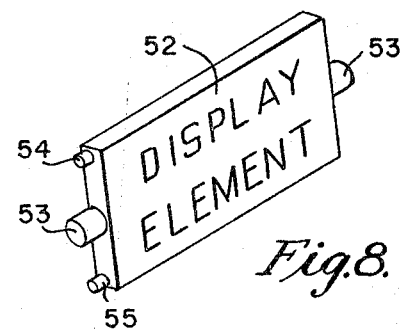
FIG. 8 is a view in perspective of one of the elements of FIG. 7.
Figure 9:
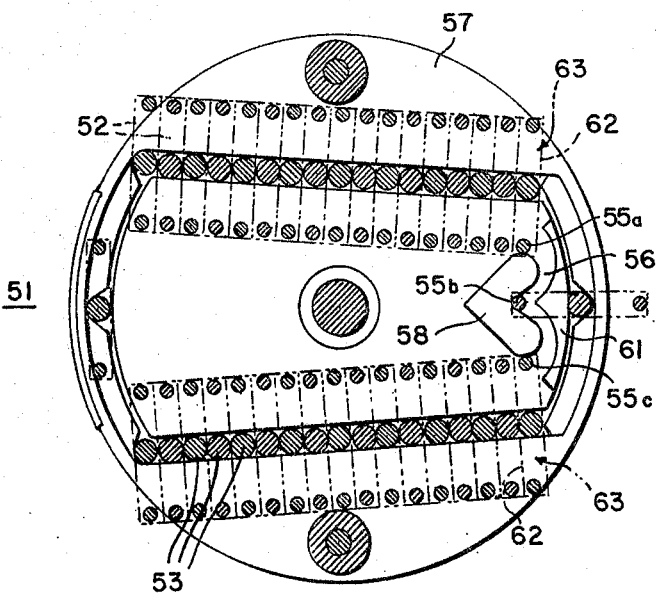
FIG. 9 is a view in section taken as indicated by the lines and arrows 9—9 which appear in FIG. 7.

FIGS. 7–9 illustrate an embodiment of the invention whereby both faces of the elements, such as 52, may be used to present information to a readout station 51. The elements 52 are provided with support lugs 53, and additionally have projecting therefrom upper and lower flipover lugs 54, 55, which are adapted to enter flipover groove 56 that is formed in guide groove plate 57 by bosses 58 and 61.

In operation, flipover groove 56 turns face 62 of an element 63 from the rear to the front, as is illustrated by the sequence in FIG. 9 wherein lug 55a moves from its lower position into the horizontal position of lug 55b and then into the upper positon of lug 55c as the lug passes through flipover groove 56.

Figure 10:
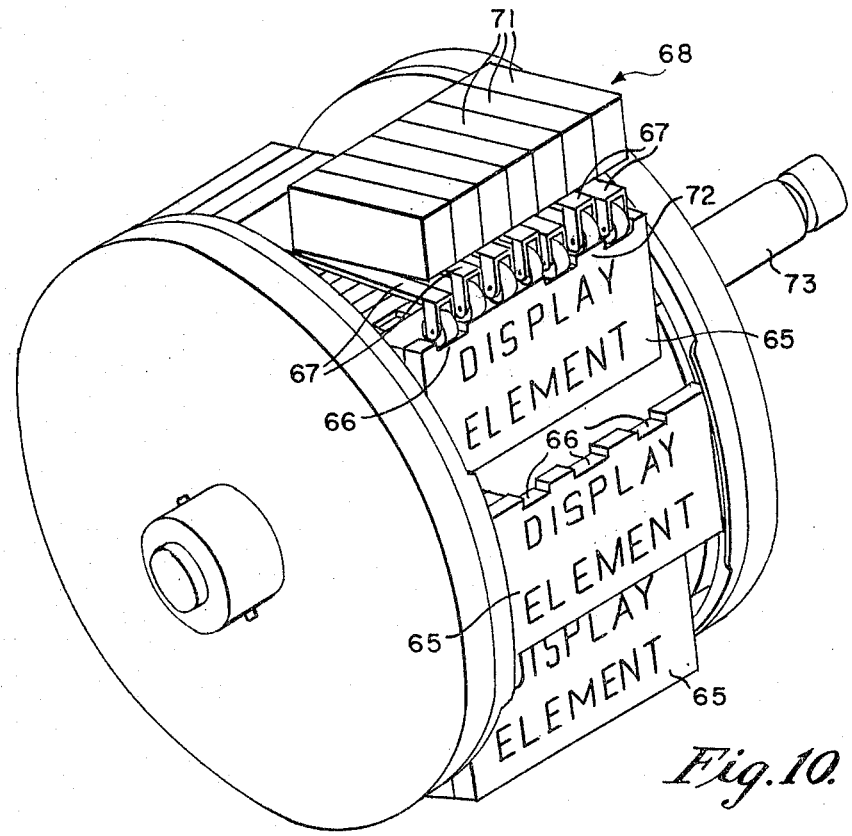
FIG. 10 is an isometric view of another embodiment of the invention.

FIG. 10 illustrates elements 65 having recesses 66 formed along the upper edge. Shoulders 72 are formed between recesses 66 and are adapted to contact and opeate the operating arms 67 of a bank 68 of switches 71. It will be realized that the switch actuating elements may be formed in the bottom edge of elements 65 and the bank 68 of switches may be mounted below the device, depending on the attitude of the device.

The device of FIG. 10 may be used as a discrete message display device or indicator, and the switch actuating shoulders 72 may be used to position a desired display element in display position and hold that element there as long as a command signal is given through the bank 68 of switches. The device may be controlled by using a comparison code control circuit which causes an electric motor coupled to shaft 73 to rotate shaft 73 continuously, thereby driving the device until the desired display element contacts switches 71 and disconnects the circuit to stop rotation of shaft 73, thus resulting in the desired message being held in display position.

Figure 11:
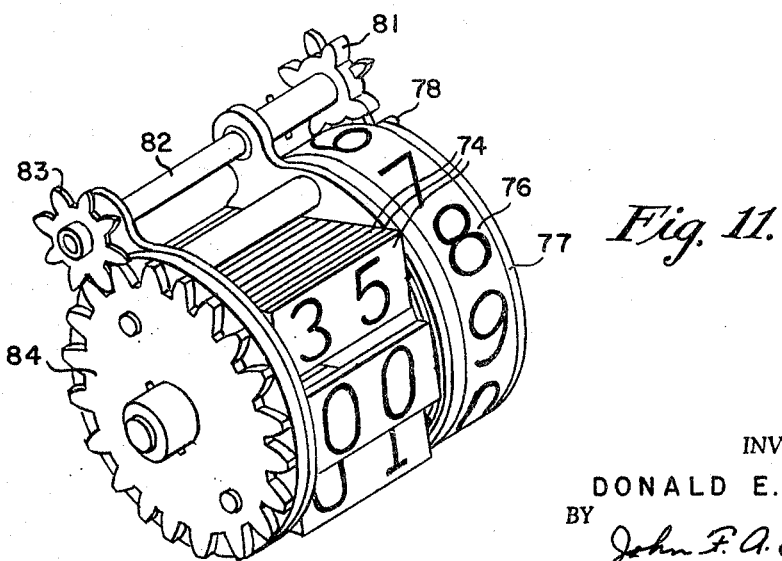
FIG. 11 is an isometric view of an angle counter constructed in accordance with the invention.
Figure 12:
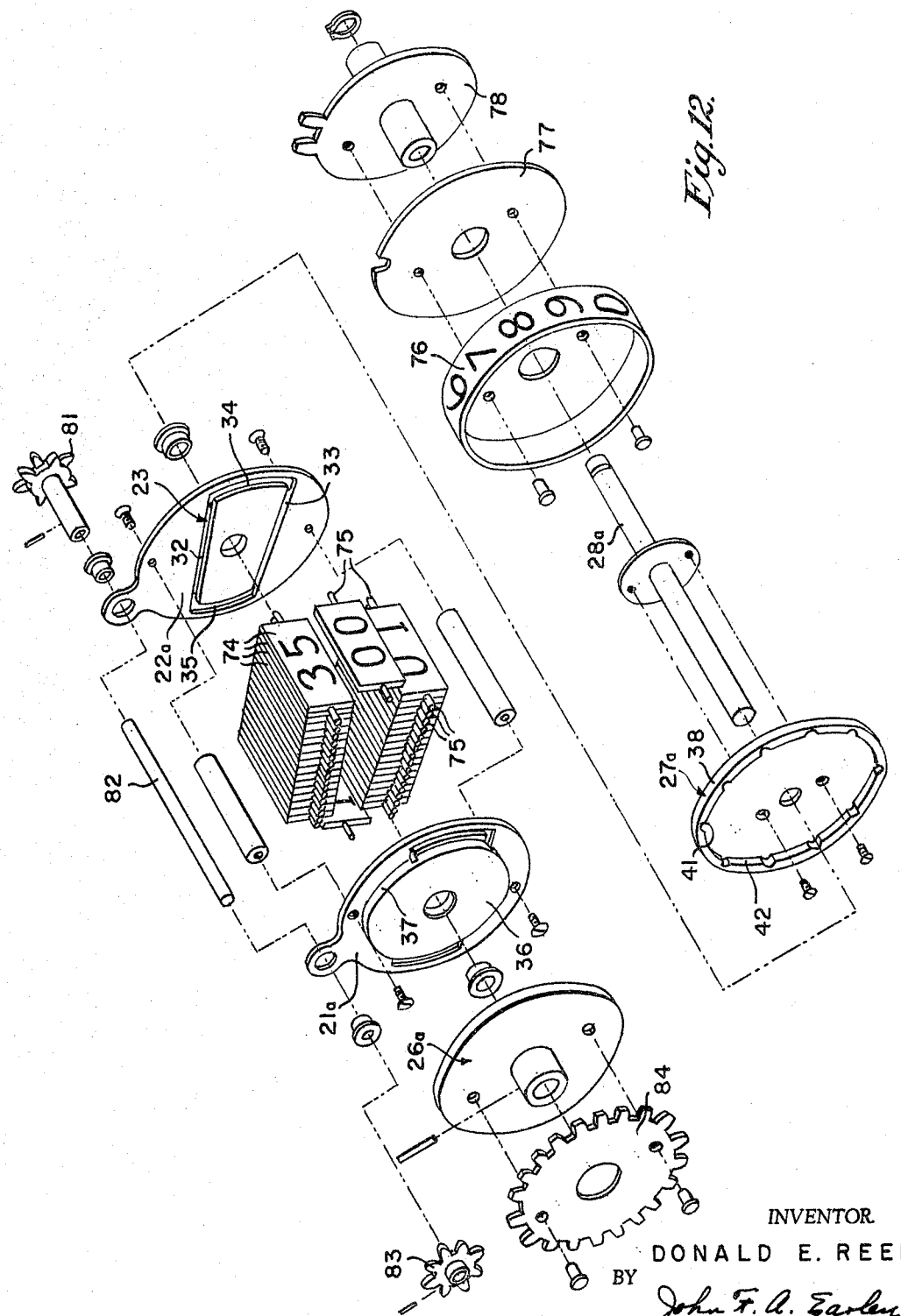
FIG. 12 is an exploded isometric view of the angle counter of FIG. 11.
Figure 13:
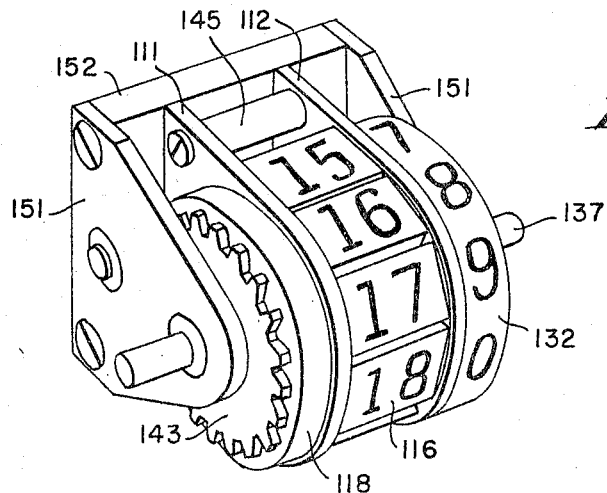
FIG. 13 is an isometric view of another embodiment of the invention.
Figure 14:
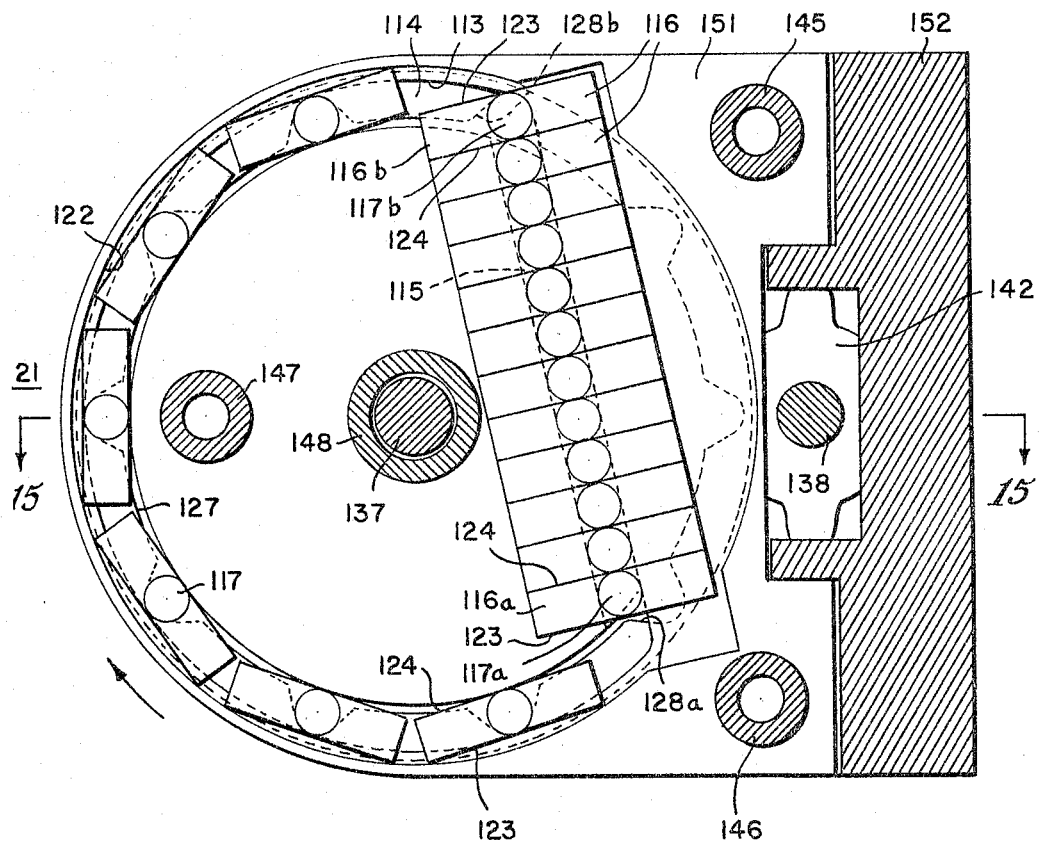
FIG. 14 is a view in section taken as indicated by the lines and arrows 14—14 which appear in FIG. 15.
Figure 15:
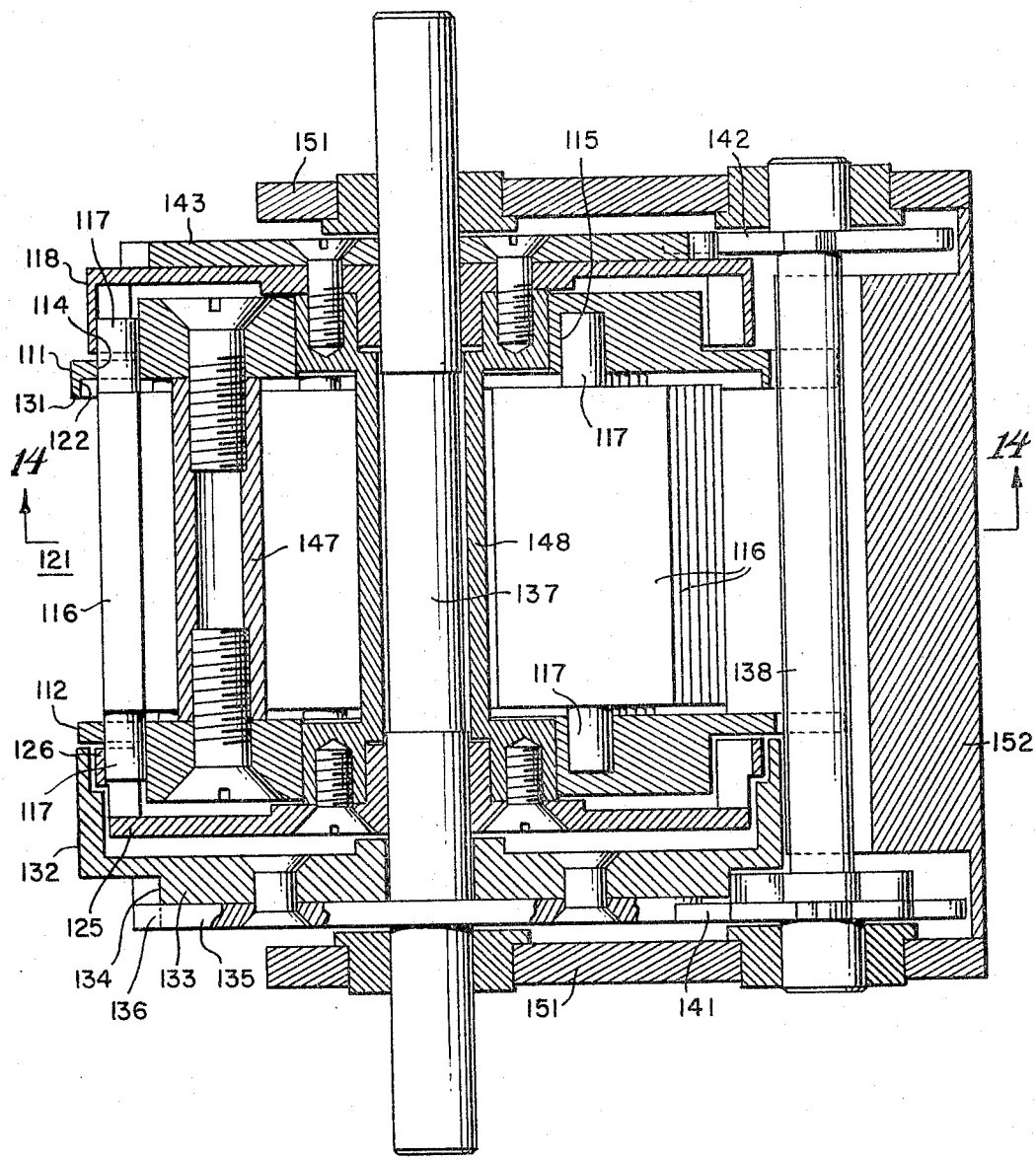
FIG. 15 is a view in section taken as indicated by the lines and arrows 15—15 which appear in FIG. 14.

The embodiment of the invention shown in FIGS. 11 and 12 illustrates a 360° angle counter which includes a series of 36 display elements 74 that display the numbers 00 through 35. Elements 74 have a support lug 75 extending from each side into guide grooves 23 and through front and rear runs 34, 35 when positioned therein.

Upper and lower runs 32 and 33 of guide grooves 23 are straight and the front and rear runs 34 and 35 are circular with the front run 34 being longer than the rear run 35 so that upper and lower runs 32, 33 slant rearwardly toward each other.

Pick-up cam wheels 26a and 27a are positioned adjacent each of the guide groove plates 21a and 22b and are provided with radial notches 41 which are adapted to move the display element lugs 75 in guide groove 23.

A 10-digit odometer drum 76 is rotatably mounted on shaft 28a adjacent pick-up cam wheel 27a, and is connected to pick-up cam wheel 26a by conventional transfer means such as the 10 to 1 Geneva gear mechanism having parts which include disc 77, disc 78 with its two teeth, pinion 81, shaft 82, pinion 83, and gear wheel 84 which is mounted on pick-up cam wheel 26a.

In operation of the angle counter shown in FIGS. 11 and 12, each revolution of the 10-digit odometer wheel 76 causes the transfer means to rotate pick-up cam wheels 26a and 27a one-tenth of a revolution to move the next numbered display element 74 into display position.

Turning now to the embodiment of the invention illustrated in FIGS. 13–16, there is shown a storage and transfer device which is adapted for use as a 360° angle counter, and uses only 18 display elements in conjunction with a 10-digit odometer wheel. The counter is reversible and operates at all attitudes, and comprises a pair of spaced-apart guide groove plates 111, 112, each having a continuous guide groove 113 formed therein including a circular transfer run 114 and a substantially straight storage run 115.

A series of elements 116 are provided, each having support lugs 117 extending laterally therefrom into the guide grooves 113. Storage run 115 is a recess formed in guide groove plates 111, 112, whereas transfer run 114 is an aperture which extends completely through plates 111, 112, from one side to the other.

Drive means, including pick-up cam wheel 118, is provided for holding elements 116 together in storage run 115 and picking up the lugs 117 and holding them captive and moving them to a desired position, such as readout station 121, and camming one lug 117b into storage run 115 and thereby pushing another lug 117a from storage run 115.

Guide means, including a guide shoulder 122 formed on guide groove plate 111, is provided for reversing front face 123 and rear face 124 of each element 116 as it returns to one end of the storage run 115. The position of faces 123 and 124 is reversed from what it was when the element left the other end of the storage run. For example, referring to FIG. 15, the bottom element 116a in storage run 115 has its front face 123 on the bottom and its rear face 124 on top. However, when element 116a returns to the top of storage run 115, its front face 123 is on top and its rear face 124 is on bottom, as is illustrated by element 116b.

Since both faces of elements 116 may be seen, at different times, at readout station 121, only 18 elements are needed to display the nuumbers 00 through 35. The numbers appear on both sides of each display element. One element 116 has 00 on its front face and 18 on its rear face; another element has 17 on its front face and 35 on its rear face.

Pick-up cam wheel 118 is positioned adjacent guide groove plate 111 and pick-up cam wheel 125 is positioned adjacent guide groove plate 112. Each cam wheel 118, 125 has an axial flange 126 with an inner cylindrical surface 127 which holds the elements 116 together in stacked arrangement in storage run 115. A series of radial cam notches 128 are formed in flange 126 and operate so that when one notch 128 is camming one lug 117 into storage run 115 it thereby pushes another lug 117 from the storage run 115 into another of said notches 128 which holds it captive and moves it in the transfer run 115 as the pick-up cam wheels 118, 125 are rotated. For example, referring to FIG. 14, notch 128b is starting to cam lug 117b into the top of transfer run 115 to thereby push lug 117a from the bottom of storage run 115 into notch 128a which will hold it captive and move it in the transfer run.

Guide groove plate 111 is provided with an axial flange 131 which has the guide shoulder 122 that extends over the sides of elements 116 and causes them to reverse their front and rear faces during the travel of the elements through the transfer run 114.

A 10-digit odometer drum 132 is mounted adjacent pick-up cam wheel 125 and has mounted thereon a disc 133 which has one tooth 134. Another disc 135 having two teeth 136 is mounted on disc 133 and is also fixedly attached to shaft 137. Transfer means, including a pinion shaft 138 and pinions 141, 142, connect shaft 137 to a gear wheel 143 which is fixedly mounted on pick-up cam wheel 118 to thereby transfer intelligence between odometer drum 132 and pick-up cam wheel 118.

Guide groove plate 111 is spaced apart from guide groove plate 112 and connected together by spacers 145–147.

Pick-up cam wheel 118 is connected to cam wheel 125 by a hollow connecting shaft 148.

Shaft 137 and pinion shaft 138 are rotatably mounted in support arms 151 which are connected together by rear support plate 152.

In operation, rotation of shaft 137 causes rotation of the odometer drum 132. Each complete rotation of the drum is transferred by the transfer mechanism including pinion shaft 138 to gear wheel 143 of pick-up cam wheel 118 and through connecting shaft 148 to cam wheel 125. This causes movement of elements 116 in transfer run 114 and in storage run 115. For example, if the readout station 121 shows 180°, odometer drum 132 may rotate from 0 to 9, then element 116 showing the number 18 moves out of the readout station position and the next element 116 which shows the number 19 moves into the readout station 121, so that the reading becomes 190°.

The display device of the present invention embodies a number of advantages over previous devices. It provides for sequential and repeatable presentation of the display elements whether the drive shaft of the device is rotated in a clockwise or a counter-clockwise direction. It provides for a larger number of display elements, uses numerals or messages which are of large size and quite readable, and yet occupies a very small space.

The present invention provides for rapid movement of the display elements. For example, a display device using a two inch diameter pick-up cam wheel 26 may display 10 one-half inch high display elements 24 per revolution of shaft 28. Also, a display device utilizing a two inch diameter cam wheel 26 may display twenty one-quarter inch high display elements 24 per revolution of shaft 28.

Moreover, the display device illustrates three messages simultaneously, if desired, as is shown at readout station 45 in FIG. 4.

The display device may be operated at any attitude, which is important in aircraft, since all the elements of the display device are captively supported. Another advantage of having all the elements supported and captive is that the parts of the display device do not become misaligned and inoperative when subjected to shock and vibration. All the display elements are positively driven and rigidly supported, and maintain their proper positions without relying on gravity, weights, springs, and so on.

It is to be noted that the individual display elements are not attached to one another, thus permitting the sequence of messages to be arranged as desired. Also, the display device is capable of displaying messages from the front and rear simultaneously, as is illustrated in FIG. 4 at readout stations 45 and 44.

The messages on display elements may be changed easily by providing that the faces of the elements be slotted to receive message-bearing inserts, such as inserts made from paper.

The height of the display elements may be increased or decreased in proportion to the diameter of the pick-up cam wheels, and there is no restriction on the width of the display elements between cam groove plates.

The angle counters of FIGS. 11 and 12, and FIGS. 13–16, are much smaller and less complex than previously known devices which use very complex and expensive gearing and counter wheels, or use an endless tape printed with the desired numerals (the tape counter occupies a large space).

The present invention may be utilized in twenty-four hour direct reading clocks. Previously, such clocks used either a complex and expensive gearing and counter wheel mechanism, or an endless tape mechanism.

The present invention may also be used for projecting photographic transparencies by constructing the display elements so that they hold the transparencies and sequentially and rapidly position them in the projection path of an optical projector.

Another use of the present invention is as a multiposition switching device with visual readout, such as is illustrated in FIG. 10.

Additionally, the present invention may be used as a storage device in a vending machine, for example. The display elements may be of large size and contain pockets which serve as storage compartments for the goods. In this use of the invention, the storage elements may be sequentially driven to an accessible position for removing the goods. The invention makes it possible to store a large volume of goods, and yet the space required for removing the goods is at a minimum. In a vending machine constructed in accordance with the present invention, a large variety of items may be dispensed from one machine. The terms "display element" and "display device" include machines, such as the above-described vending machine with its storage elements, which do not actually display anything, just so long as the structure and operation of the machine is that of the described invention.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

The claimed invention:

1. A reversible storage and transfer device and the like which operates at all attitudes, comprising a pair of spaced-apart guide groove plates each having a continuous guide groove formed therein, said grooves including a transfer run and a storage run, a series of elements each having support lugs extending laterally therefrom into said guide grooves, and reversible drive means including a member having a series of cammed notches for continuously engaging the elements in the transfer run and continuously engaging the end elements in the storage run for holding said elements together in said storage run and picking up the lugs of each element and holding them captive in the transfer run and moving said captive elements to a desired position.

2. A reversible storage and transfer device and the like which operates at all attitudes, comprising a pair of spaced-apart guide groove plates each having a continuous guide groove formed therein, said grooves including a transfer run and a storage run, a series of elements each having support lugs extending laterally therefrom into said guide grooves, and a pick-up cam wheel positioned adjacent each of said guide groove plates and having an axial flange with an inner cylindrical surface continuously in contact with the support lugs of the end elements in the storage run which holds said elements together in stacked arrangement in said storage run, said pick-up cam wheel having radial cam notches formed in said flange which operate so that when one of said notches is camming one lug into the storage run it thereby pushes another lug from the storage run into another of said notches which holds it captive and moves it in the transfer run.

3. The reversible storage and transfer device defined in claim 2, wherein are provided upper and lower flipover lugs extending laterally from said elements, and flipover means for picking up said flipover lugs to flip its element over on the other side.

4. The reversible storage and transfer device defined in claim 3, wherein said flipover means comprises a slipover groove formed in said guide groove plate adapted to receive said flipover lugs and flip its associated element on the other side.

5. The reversible storage and transfer device defined in claim 2, wherein said elements have switch actuating elements formed along an edge parallel to the axis of its support lugs, said actuating elements being adapted to contact and operate switches.

6. The device defined in claim 5, wherein is provided a bank of switches mounted so that switch operating arms are adapted to contact said switch actuating elements.

7. A reversible 360° angle counter and the like which operates at all attitudes comprising a pair of spaced-apart guide groove plates having a continuous guide groove formed in each plate with a storage run and a transfer run, said storage run being straight and said transfer run being circular, a series of thirty-six display elements displaying the numbers 00 through 35 on one side and having support lugs extending laterally therefrom into said guide grooves and extending through said front and rear transfer runs when positioned therein, a pick-up cam wheel positioned adjacent each of said guide groove plates and having an axial flange with an inner cylindrical surface which holds said elements together in stacked arrangement in said storage runs, said pick-up cam wheel having radial cam notches formed in said flange, one of which cams one lug into a storage run and thereby pushes another lug from that storage run into another of said notches which holds the lug captive and moves it in a transfer run, a 10-digit odometer drum rotatably mounted adjacent one of said pick-up cam wheels, and transfer means connecting said odometer drum to one of said pick-up cam wheels for transferring intelligence therebetween.

8. A reversible storage and transfer device and the like which operates at all attitudes, comprising a pair of spaced-apart guide groove plates each having a continuous guide groove formed therein, said grooves including a transfer run and a storage run, a series of elements each having support lugs extending laterally therefrom into said guide grooves, a pick-up cam wheel positioned adjacent each of said guide groove plates and having an axial flange with an inner cylindrical surface in continuous contact with said elements in said transfer run and in continuous contact with the end elements in said storage run to hold said elements together in stacked arrangement in said storage run, said pick-up cam wheel having radial cam notches formed in said flange which operate so that when one of said notches is camming one lug into the storage run it thereby pushes another lug from the storage run into another of said notches which holds it captive and moves it in the transfer run, and guide means for reversing the front and rear faces of each element as it returns to one end of the storage run from what they where when said element left the other end of said storage run.

9. The device defined in claim 8, wherein said guide means for reversing said front and rear faces comprises an axial flange formed on at least one of said guide groove plates having a guide shoulder which extends over the sides of said elements.

10. A reversible display device and the like which operates at all attitudes, comprising a pair of spaced-apart guide groove plates each having a continuous guide groove formed therein, said grooves including a transfer run and a storage run, a series of display elements each having support lugs extending laterally into said guide grooves, and a pick-up cam wheel positioned adjacent each of said guide groove plates and having radial notches which receive said support lugs and hold them captive and move them in said transfer run when said cam wheels are rotated, said guide grooves having a single storage run in which the display elements therein are stacked adjacent to each other in parallel fashion and held together at each end of the storage run by said pick-up cam, and guide means for reversing the front and rear faces of each display element as it returns to one end of the storage run from what it was when said display element left the other end of said storage run.

11. A reversible 360° angle counter which operates at all attitudes comprising a pair of spaced-apart guide groove plates each having a continuous guide groove formed therein, said grooves including a curved transfer run and a substantially straight storage run, a series of 18 display elements which display the numbers 00 through 35 since numbers appear on both sides of the display element, support lugs extending laterally from the display elements into said guide grooves and extending through said transfer run when positioned therein, a pick-up cam wheel positioned adjacent each of said guide groove plates and having 10 radial notches which receive said lugs and hold them captive and move them in said tarnsfer run when said cam wheels are rotated, said guide grooves having a single storage run in which the display elements therein are stacked adjacent to each other in parallel fashion and held together at each end of the storage run by said pick-up cam, guide means for reversing the front and rear faces of each display element as it returns to one end of the storage run from what it was when said display element left the other end of said storage run, a 10-digit odometer drum rotatably mounted adjacent one of said cam wheels, and transfer means connecting said odometer drum to one of said pick-up cam wheels to transfer intelligence therebetween.

12. A reversible storage and transfer device and the like which operates at all attitudes, comprising a pair of spaced-apart guide groove plates each having a continuous guide groove formed therein, said grooves including a transfer run and a storage run, a series of display elements each having support lugs extending laterally therefrom into said guide grooves, and reversible drive means for both captively retaining said elements together in said storage run and captively moving each of said elements in sequence from said storage run through said transfer run, said drive means being continuously in contact with the lugs of the elements at the opposite ends of said storage run to hold the elements together in said storage run, and continuously engaging the lugs of each element in the transfer run to captively transport the elements in said transfer run, and said drive means provided with aligned camming means disposed on opposite ends of the storage run for progressively camming the lugs of each element from the transfer run into the storage run and concurrently engaging and driving the lugs at the opposite end of the storage run into the transfer run.

13. In the storage and transfer device of claim 12, said continuous guide groove in said plates additionally having a second storage run with said transfer run interconnecting said storage run and second storage run.

14. In the device of claim 12, said display elements having upper and lower flipover lugs extending from a side of each element, and a flipover groove formed in one of said guide groove plates to receive said flipover lugs and flip its associated element over on the other side.

15. In the device of claim 12, said display elements having switch actuating elements formed along an edge thereof and electrical switches selectively engaged by said switch elements.

16. In the device of claim 12, a rotatably mounted odometer drum, and transfer means connected between the odometer drum and drive means for transferring intelligence therebetween.

17. In the device of claim 12, said continuous guide grooves including a second storage run, with said storage run and second storage run being straight and said transfer run being circular and interconnecting said storage run and second storage run, a series of 36 display elements displaying the numbers 00 through 35, a 10-digit odometer drum rotatably mounted adjacent one of said plates, and transfer means connecting the odometer drum to said drive means.

References Cited by the Examiner

UNITED STATES PATENTS

| | | | |
|---|---|---|---|
| 954,942 | 4/1910 | Dossett | 40—78 |
| 981,167 | 1/1911 | Chick | 40—78 |
| 1,693,075 | 11/1928 | Frier | 40—44 |
| 2,729,007 | 1/1956 | Littman | 40—36 |
| 2,770,899 | 11/1956 | Littman | 40—36 |

FOREIGN PATENTS

| | | |
|---|---|---|
| 108,994 | 11/1939 | Australia. |
| 65,487 | 2/1947 | Denmark. |
| 15,111 | 1909 | Great Britain. |
| 96,098 | 6/1939 | Sweden. |

RICHARD B. WILKINSON, *Primary Examiner.*

JEROME SCHNALL, LEO SMILOW, *Examiners.*

J. WILL, W. GRIEB, C. G. COVELL,
*Assistant Examiners.*